(12) United States Patent
Wintermann

(10) Patent No.: US 7,197,103 B2
(45) Date of Patent: Mar. 27, 2007

(54) CONTROL ROD DRIVE FOR A NUCLEAR REACTOR AND METHOD FOR MOVING A CONTROL ROD INTO A REACTOR CORE OF A NUCLEAR REACTOR

(75) Inventor: Benedikt Wintermann, Buckenhof (DE)

(73) Assignee: Framatome ANP GmbH, Erlangen (DE)

( * ) Notice: Subject to any disclaimer, the term of this patent is extended or adjusted under 35 U.S.C. 154(b) by 570 days.

(21) Appl. No.: 10/319,345

(22) Filed: Dec. 13, 2002

(65) Prior Publication Data

US 2007/0030941 A1 Feb. 8, 2007

(30) Foreign Application Priority Data

Dec. 13, 2001 (DE) ................ 101 61 219

(51) Int. Cl.
*G21C 7/06* (2006.01)
(52) U.S. Cl. ............... 376/230; 376/234; 376/232; 376/229
(58) Field of Classification Search ........... 376/228, 376/229, 230, 231, 232, 234
See application file for complete search history.

(56) References Cited

U.S. PATENT DOCUMENTS

| 3,627,632 | A | * | 12/1971 | Acher et al. ........... 376/230 |
| 3,752,736 | A | * | 8/1973 | Kornbichler et al. ....... 376/230 |
| 3,775,247 | A | * | 11/1973 | Ode et al. ............ 376/229 |
| 5,276,719 | A | * | 1/1994 | Batheja et al. ......... 376/230 |
| 5,581,587 | A | * | 12/1996 | Satoh et al. ........... 376/230 |
| 5,661,771 | A | | 8/1997 | Sridhar et al. |
| 5,854,817 | A | | 12/1998 | Schulze |
| 2001/0016025 | A1 | | 8/2001 | Schulze |

FOREIGN PATENT DOCUMENTS

| DE | 1 230 140 | 12/1966 |
| DE | 33 42 838 A1 | 6/1984 |
| DE | 44 41 751 C1 | 4/1996 |
| DE | 196 49 272 A1 | 10/1997 |
| DE | 198 27 443 A1 | 12/1999 |
| GB | 987 880 | 3/1965 |

\* cited by examiner

*Primary Examiner*—Ricardo J. Palabrica
(74) *Attorney, Agent, or Firm*—Laurence A. Greenberg; Werner H. Stemer; Ralph E. Locher

(57) ABSTRACT

A control rod drive contains a drive housing, in which a control rod carrying element is moveable between a basic position and an end position. The control rod carrying element is guided over a portion in a throttle bush. Formed across the throttle bush is a free flow cross section for a pressure fluid which varies in dependence on a position of the control rod carrying element. During an emergency shutdown, in which the control rod carrying element is moved hydraulically via a pressure fluid, the flow resistance for the pressure fluid is reduced, when the control rod carrying element reaches the end position. Therefore, a braking of the control rod carrying element takes place before it reaches the end position, thus reducing mechanical loads during braking. A flow resistance change takes place via a variable outside diameter of the control rod carrying element and/or by a bypass orifice.

11 Claims, 3 Drawing Sheets

CONTROL ROD DRIVE FOR A NUCLEAR REACTOR AND METHOD FOR MOVING A CONTROL ROD INTO A REACTOR CORE OF A NUCLEAR REACTOR

BACKGROUND OF THE INVENTION

Field of the Invention

The invention relates to a control rod drive for a nuclear reactor, in particular for a boiling water reactor, and to a method for moving a control rod into a reactor core of the nuclear reactor, in particular for the emergency shutdown of the nuclear reactor.

In a nuclear reactor, in particular in a light water reactor, a regulation of the nuclear chain reaction takes place, above all, by what are known as control rods that are moved into individual fuel assemblies or between these and absorb neutrons. The control rods are used both for regulating the power of the nuclear reactor, for example during start-up and during its normal operation, and for an emergency shutdown of the nuclear reactor in the event of an accident.

In a boiling water reactor, the control rods are conventionally introduced from below into the reactor core disposed within a reactor pressure vessel. A control rod drive, with the aid of which the control rods are moved in and out, is disposed outside the reactor pressure vessel. In the event of an emergency shutdown, the control rods are shot hydraulically into the reactor core in the shortest possible time. For this purpose, the control rod drive is connected to a pressure line, what is known as the scram line.

German Patent DE 44 41 751 C1, corresponding to U.S. Pat. No. 5,854,817, describes an emergency shutdown system and a method for the emergency shutdown of a nuclear rector, in which the individual control rods are divided into groups capable of being activated independently of one another.

SUMMARY OF THE INVENTION

It is accordingly an object of the invention to provide a control rod drive for a nuclear reactor and a method for moving a control rod into a reactor core of a nuclear reactor that overcome the above-mentioned disadvantages of the prior art devices and methods of this general type, in which it is possible for the control rod to be moved in carefully and in an improved way in the event of an emergency shutdown.

With the foregoing and other objects in view there is provided, in accordance with the invention, a control rod drive for a nuclear reactor. The control rod drive contains a drive housing, a throttle bush disposed at least partially in the drive housing, a drive unit, and a control rod carrying element disposed in the drive housing and moveable between a basic position and a moved-in end position. A part of the control rod carrying element is guided in the throttle bush and the control rod carrying element has a lower end cooperating with the drive unit. The control rod carrying element and the throttle bush define there-between a flow path for a pressure fluid, the flow path leading beyond the throttle bush and has a free flow cross section varying in dependence on a position of the control rod carrying element.

In the control rod drive, there is provision for the free flow cross section of the flow path leading beyond the throttle bush to be changed as a function of the current position of the control carrying element. The flow path is in this case formed, in particular, by the gap between the throttle bush and a control rod carrying element configured, in particular, as a hollow piston.

The invention proceeds, in this case, from the notion of varying the pressure acting on the hollow piston (control rod carrying element) by suitably influencing the pressure drop across the throttle bush and of setting the pressure to the effect that the speed of the hollow piston changes when the latter is being shot in. As a result, a suitable speed profile, which avoids critical load peaks, can therefore be formed over the move-in length of the hollow piston.

Therefore before the moved-in end position of the hollow piston is reached, the speed is reduced as far as possible, in order to keep the impact forces low when the hollow piston butts against the throttle bush. Thus, by a suitable choice of the flow conditions between the throttle bush and the hollow piston, it becomes possible, as a function of the position of the hollow piston, to have a moving-in which entails markedly lower mechanical loads, as compared with a conventional control rod drive.

By virtue of the lower loads, additional braking devices, such as, for example, a spring element, can have a simpler and, in particular, shorter configuration. Overall, the construction length of the entire control rod drive can thereby be shortened.

In an expedient development, the free flow cross section increases from the basic position in the moved-out state to the moved-in end position. By the basic position, it is meant, in this context, that the control rod is moved completely out of the reactor core. What is achieved by this measure is that the pressure acting on the hollow piston and consequently the speed of the hollow piston are reduced when the latter approaches the moved-in end position. The flow resistance for the pressure fluid between the throttle bush and the hollow piston is therefore reduced, so that the pressure fluid can pass with a low resistance into the interior of the reactor pressure vessel.

In order to achieve these varying flow conditions with a simple design, there is provision, in a preferred development, for the control rod carrying element to have a changing outside diameter. That is to say, when the control rod carrying element moves through the throttle bush, the gap between these two elements changes automatically due to the changing outside diameter. Expediently, in this case, the control rod carrying element has a reduced outside diameter in a lower region facing the drive unit, in order to achieve the desired braking behavior of the hollow piston when the latter reaches the moved-in end position.

With a view to a suitable flow routing, the control rod carrying element preferably narrows continuously to the reduced outside diameter in a narrowing region, so that the flow resistance changes continuously. In particular, in this case, the control rod carrying element has a conically running region, as seen in cross section.

With a view to suitable braking behavior, while at the same time maintaining a sufficiently rapid shoot-in of the respective control rod, the control rod carrying element has a reduced diameter uniformly over a defined length only.

For the changing flow resistances as a function of the position of the control rod carrying element, alternatively to or in combination with the reduction in the outside diameter of the control rod carrying element, preferably a bypass orifice is provided in the control rod carrying element configured as a hollow body. A flow path leading beyond the throttle bush is therefore also open to the pressure fluid via the bypass orifice, but is effective only when the bypass orifice is in the region of the throttle bush during moving-in and, in particular when the bypass orifice has run through the throttle bush, that is to say located inside the reactor pressure vessel. The change in the flow resistance in this case is determined essentially according to the size of the bypass orifice. A plurality of bypass orifices in different length positions of the hollow body may also be provided.

In the combination of the reduced outside diameter with the bypass orifice, the latter is disposed preferably in the region upstream or in the region of the narrowing of the control rod carrying element to the reduced outside diameter. Advantageously, therefore, a change in the flow conditions is achieved even before the reduced outside diameter becomes effective. By virtue of the two independent measures of the bypass orifice and of the reduced outside diameter, a desired speed profile can be set in a simple way.

Expediently, the control rod carrying element has, in the region with the reduced outside diameter, an outer web which is located within the throttle bush when the control rod carrying element is positioned in the moved-in end position. This measure brings about an increase in the flow speed when the hollow piston has reached the moved-in position. The penetration of dirt particles is consequently avoided. Expediently, the outer web is configured as a peripheral annular web, the outside diameter of which corresponds approximately to the inside diameter of the throttle bush. The annular web therefore largely seals off, with the exception of a tolerance clearance, the gap that exists between the reduced outside diameter and the throttle bush.

For reliable guidance of the control rod carrying element in a guide tube provided for this purpose, preferably longitudinal webs are disposed in the region of the reduced outside diameter. These virtually interrupt the reduced outside diameter and extend in the radial direction as far as the normal outside diameter, that is to say the original outside diameter, which is not yet reduced. The longitudinal webs are in this case disposed in such a way that, when the control rod carrying element is moved in, they are guided by guide elements, in particular guide rollers, disposed inside the guide tube.

The object is achieved furthermore, according to the invention, by a method for moving a control rod into a reactor core of a nuclear reactor. Accordingly, there is provision, during moving-in, for the flow resistance formed for the pressure fluid across the throttle bush to be changed.

The advantages and preferred embodiments given with regard to the control rod drive may also be transferred accordingly to the method.

Other features which are considered as characteristic for the invention are set forth in the appended claims.

Although the invention is illustrated and described herein as embodied in a control rod drive for a nuclear reactor and a method for moving a control rod into a reactor core of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 4:
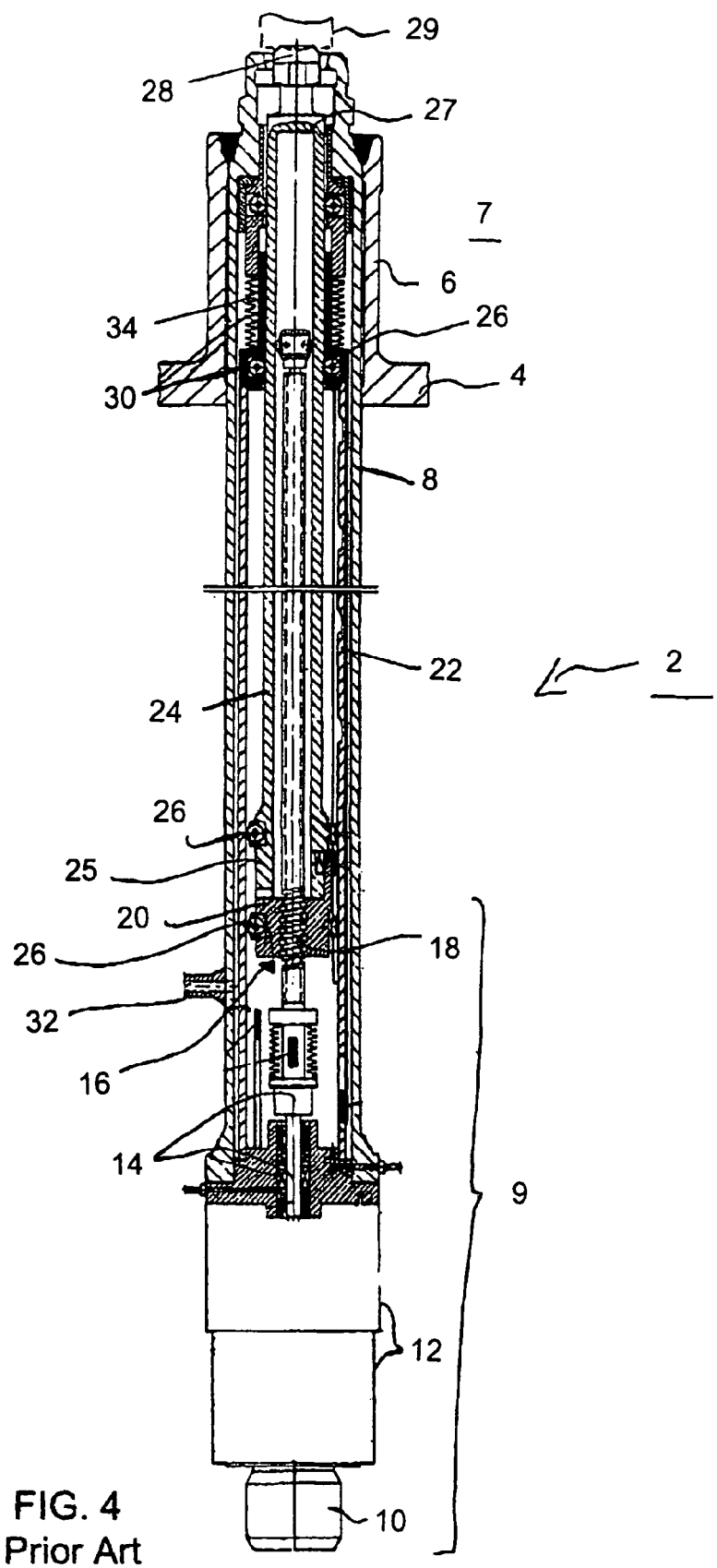
FIG. 4 is a sectional view of a control rod drive of the conventional type.

In all the figures of the drawing, sub-features and integral parts that correspond to one another bear the same reference symbol in each case. Referring now to the figures of the drawing in detail and first, particularly, to FIG. 4 thereof, there is shown the basic construction of a control rod drive 2. FIG. 4 shows the control rod drive 2 in a partially sectional illustration and in its position mounted on a reactor pressure vessel 4. Only a detail of the reactor pressure vessel 4 can be seen in FIG. 4.

The control rod drive 2 is fastened by a drive housing 8 to a connection piece 6 extending into an interior 7 of the reactor pressure vessel 4. A drive unit 9 is provided on the drive housing 8 on the end face, outside the reactor pressure vessel 4, the drive unit 9 contains a motor 10 which drives a drive shaft 14 by a spindle drive 16 via a gear unit 12. The spindle drive 16 is formed from a spindle 18 which is produced on the drive shaft 14 and which is guided by a nut 20. The nut 20 is guided within a guide tube 22 and carries a hollow piston 24 that, with its lower end configured in the manner of a flange 25, sits loosely on the nut 20. Both the nut 20 and the hollow piston 24 are guided via guide rollers 26 in the guide tube 22 disposed concentrically to the drive housing 8. The hollow piston 24 has, at its upper closed end 27, a coupling 28, to which is fastened a control rod 29 to be moved, which is indicated merely in a rudimentary and greatly simplified manner. The coupling 28 therefore extends into the interior of the reactor pressure vessel 4. In an upper region of the drive housing 8, specifically in the region of the connection piece 6, is disposed what is known as a throttle bush 30 which surrounds the hollow piston 24 so as to form a tolerance clearance.

During normal operation, the control rod 29 is moved in and out with the aid of the spindle drive 16. In the event of an emergency shutdown, a pressure fluid that is under a very high pressure of, for example, 150 bar is injected via a pressure line connection 32 and causes the hollow piston 24 to shoot upward, irrespective of the position of the nut 20. Since only the tolerance clearance (leakage gap) forming a flow path is present between the throttle bush 30 and the hollow piston 24, the pressure provided by the pressure fluid builds up completely and leads to an acceleration of the hollow piston 24. When the latter, with its flange 25, reaches the throttle bush 30 acting as a counterstop, a virtually abrupt braking of the hollow piston 24 takes place. Although the forces occurring at the same time are absorbed by a suitable mounting and, in particular, by a suitably dimensioned spring element 34, the mechanical load is nevertheless very high. Moreover, there is the problem that, when the pressure line connected to the pressure line connection 32 is opened, a pressure pulse occurs that may lead to excess speed and to an increased load.

Figure 1:
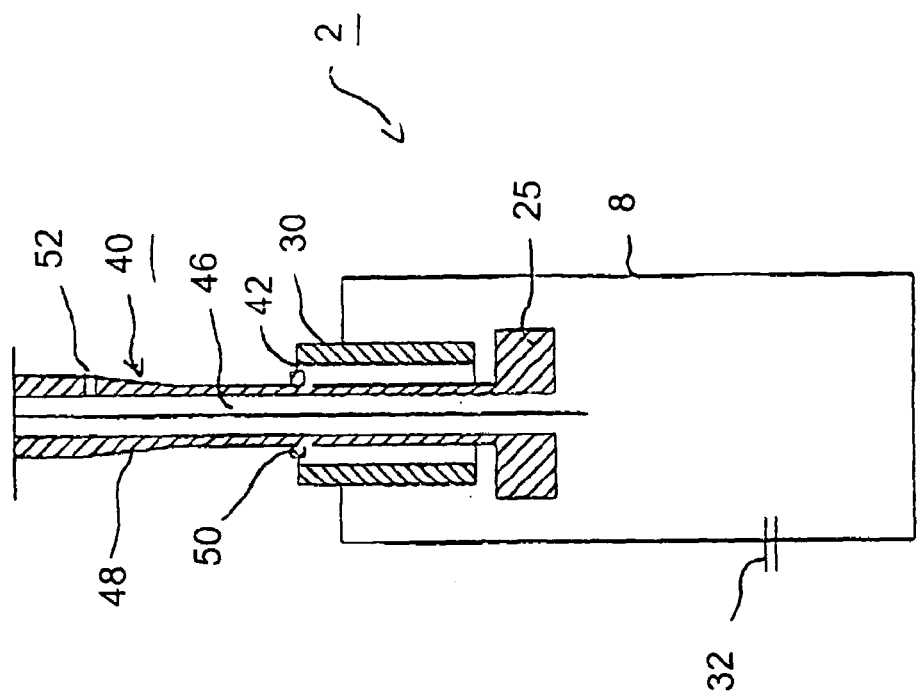
FIG. 1 is a greatly simplified diagrammatic, sectional view of a detail of a control rod drive in a region of a throttle bush, in which drive a control rod carrying element is in an intermediate position between a lower moved-out basic position and an upper moved-in end position according to the invention.
Figure 2:
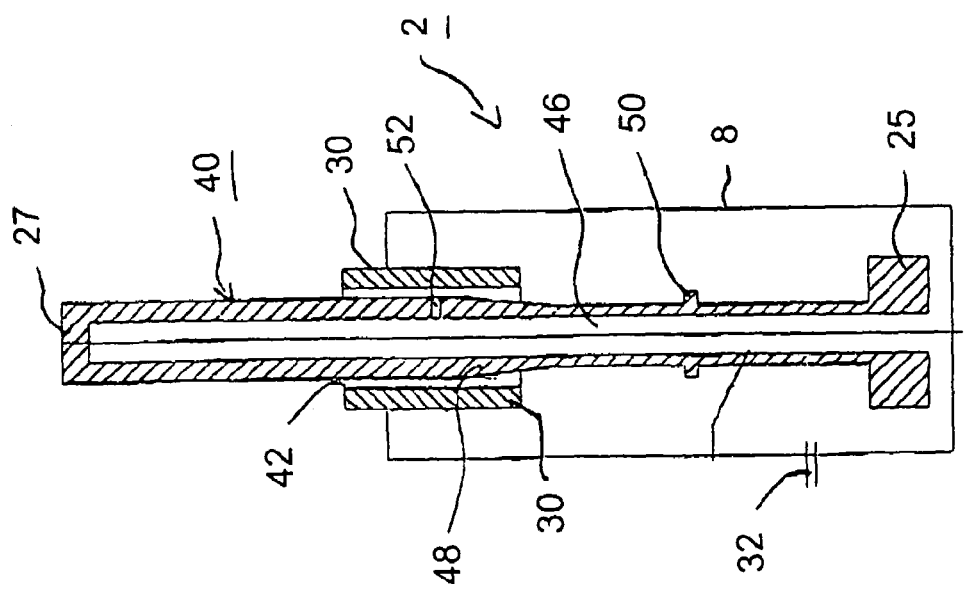
FIG. 2 is a sectional view of a detail of the control rod drive shown in FIG. 1 in the moved-in upper end position.

According to the invention and as shown in FIGS. 1 and 2, a control rod carrying element 40 configured as a hollow piston is guided by the throttle bush 30. The throttle bush 30 and the control rod carrying element 40 are disposed within the drive housing 8 illustrated only in greatly simplified form here. The throttle bush 30 is disposed only in the region of the connection piece 6 (FIG. 4), that is to say extends only over a comparatively short length of the control rod carrying element 40. The pressure line connection 32 issues laterally into the drive housing 8.

According to FIG. 1, the control rod carrying element 40 is in an intermediate position between a lower basic position and the upper moved-in end position illustrated in FIG. 2. In the basic position, the upper closed end 27 of the control rod carrying element 40 is approximately flush with the upper end of the throttle bush 30.

The control rod carrying element 40 extends from the flange 25 at its lower open region to its upper closed end 27. Whereas a cavity 46 enclosed by the control rod carrying element 40 has a constant inside diameter, the outside diameter of the control rod carrying element 40 changes over its length. As a result, a gap width of a gap located between the throttle bush 30 and the control rod carrying element 40 changes as soon as a relative position between the throttle bush 30 and the control rod carrying element 40 changes. A flow path 42 is therefore formed from the inside of the drive housing 8 into the interior 7 of the reactor pressure vessel 4, the free flow cross section of the flow path 42 varies as a function of the position of the control rod carrying element 40. In this case, the control rod carrying element 40 has, in the region of its upper end 27, the maximum outside diameter which is maintained over part of its overall length. The control rod carrying element 40 subsequently narrows continuously in a narrowing region 48 to a reduced outside diameter which the control rod carrying element 40 maintains as far as the flange 25. The reduction in the outside diameter is achieved by a reduction in the wall of the control rod carrying element 40.

Furthermore, in the exemplary embodiment, the control rod carrying element 40 has a bypass orifice 52 which is disposed in the region above the narrowing region 48 and, in particular, adjoins the latter. As a result, with the control rod carrying element 40 being in a suitable position, a further flow path for the pressure fluid is formed via the interior 46 through the wall of the control rod carrying element 40 into the interior 7 of the reactor pressure vessel 4. The configuration of the bypass orifice 52 is not absolutely necessary.

Disposed approximately centrally between the narrowing region 48 and the flange 25 is a peripheral annular web 50, the outside diameter of which, in the exemplary embodiment, corresponds approximately to the maximum outside diameter in the upper region of the control rod carrying element 40. As may be gathered from FIG. 2, the annular web 50 is disposed in such a way that it is located at the upper end of the throttle bush 30 when the control rod carrying element 40 is positioned in the upper moved-in end position. The flange 25 in this case acts as a counterstop, with which the control rod carrying element 40 butts against the throttle bush 30 during moving-in.

By virtue of this special configuration of the control rod carrying element 40 with its varying outside diameters and with the bypass orifice 52, the flow resistance for the pressure fluid, which can flow beyond the throttle bush 30 into the interior 7 of the reactor pressure vessel 4, changes as a function of the position which the control rod carrying element 40 in each case currently assumes.

In the event of an emergency shutdown, a pressure fluid is injected via the pressure line connection 32 and can escape only partially via the flow path 42 because of the high flow resistance of the latter. The control rod carrying element 40 therefore experiences high acceleration due to the high pressure build-up and is moved upward at high speed. When the control rod carrying element 40 reaches the middle position illustrated in FIG. 1, the flow resistance gradually decreases, that is to say the pressure acting on the control rod carrying element 40 is reduced, so that, overall, the control rod carrying element 40 is braked somewhat. The reduction in flow resistance takes place initially via the bypass orifice 52 which allows the pressure fluid to flow out of the cavity 46 over into the flow path 42 and from there into the interior of the reactor pressure vessel 4. When the control rod carrying element 40 is moved upward even further, the bypass orifice 52 allows an immediate flow of the pressure fluid out of the cavity 46 over into the interior 7.

The flow resistance is subsequently additionally achieved by the reduction in the outside diameter along the narrowing region 48. By virtue of the constant and continuous narrowing, a continuous and uniform reduction in the speed of the control rod carrying element 40 likewise takes place. The continuous change in the outside diameter and consequently the continuous change in the flow resistance are advantageous for a moving-in which is as uniform and as jolt-free as possible and is consequently as careful as possible in terms of material. When the narrowing region 48 passes the throttle bush 30, the control rod carrying element 40 is brought into the upper moved-in end position (FIG. 2) at an essentially constant low speed over the last travel segment.

As soon as the annular web 50 enters the flow path 42, the flow resistance of the latter and consequently the outflow speed rise again, with the result that a dirt-repelling flow is achieved. The flow path via the bypass orifice 52 is still open.

Figure 3:
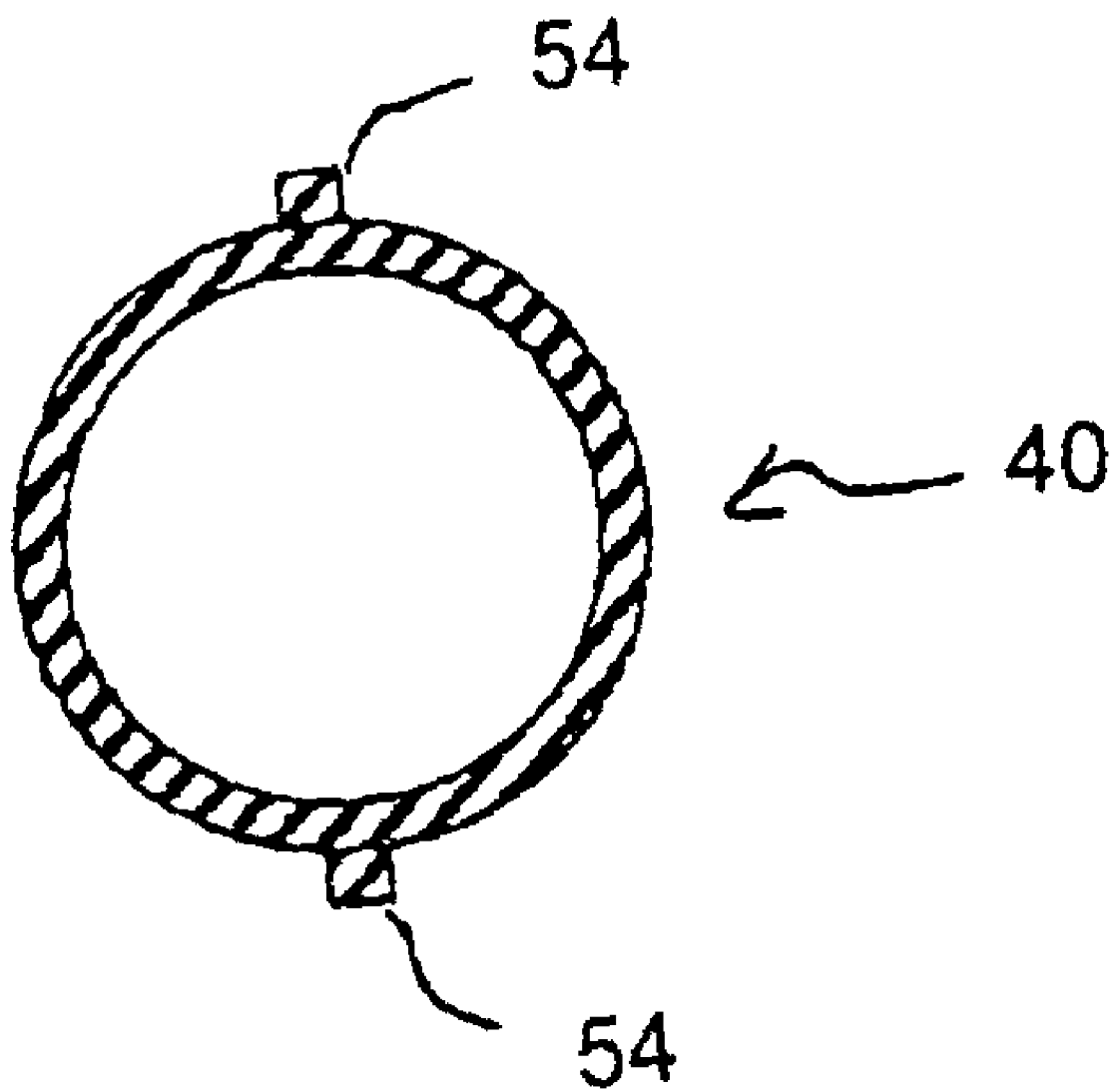
FIG. 3 is a cross-sectional view of the control rod carrying element in a region of a reduced outside diameter with longitudinal webs.

In order to ensure a reliable guidance of the control rod carrying element 40 during moving-in, longitudinal webs 54 are disposed in the region of the reduced outside diameter, as may be gathered from FIG. 3. In the exemplary embodiment, two mutually opposite longitudinal webs 54 are provided, which define an outside diameter that corresponds, in particular, to the normal outside diameter of the control rod carrying element 40 upstream of the narrowing region 48. By the longitudinal webs 54, the control rod carrying element 40 is guided reliably, within the guide tube 22 illustrated in FIG. 4, on the guide rollers 26 provided in the region of the throttle bush 30. The longitudinal webs 54 may, if required, also be configured as rails.

By the device according to the invention, a setting of the moving-in speed of the control rod element 40 as a function of its respective position is achieved by simple measures. As a result, in particular, a suitable braking of the control rod carrying element 40 before the moved-in end position is reached can be obtained. Furthermore, there is thereby the possibility of reducing a system-related excess speed caused by pressure peaks generated during the inflow operation of the pressure fluid. By virtue of these measures, the components of the control rod drive, in particular the components provided for braking, such as, for example, the spring element 34 (FIG. 4), are subjected to a markedly lower load than in the conventional configuration. This makes it possible, overall, to have a simpler configuration of the components necessary for the braking operation and, as compared with the conventional configuration, is accompanied by a shortening of the construction length of these components, since, for example, the forces to be absorbed by the spring element 34 are lower and the spring element 34 can thereby be shortened.

The principle illustrated in FIGS. 1 and 2 is used preferably in the control rod drive 2 for a boiling water reactor, such as is illustrated, for example, in FIG. 4. The control rod drive 2 illustrated in FIG. 4 is therefore modified to the effect that the control rod carrying element 40 illustrated diagrammatically in FIGS. 1 to 3 is used instead of the hollow piston 24, illustrated in FIG. 4, with the constant outside diameter.

I claim:

1. A control rod drive for a nuclear reactor, comprising:
   a drive housing;
   a throttle bush disposed at least partially in said drive housing;
   a drive unit; and
   a control rod carrying element disposed in said drive housing and moveable between a basic position and a moved-in end position, a part of said control rod carrying element being guided in said throttle bush and said control rod carrying element having a lower end cooperating with said drive unit, said control rod carrying element and said throttle bush defining therebetween a flow path for a pressure fluid, said flow path leading beyond said throttle bush and having a free flow cross section varying in dependence on a position of said control rod carrying element.

2. The control rod drive according to claim 1, wherein said free flow cross section increases when the control rod carrying element moves from the basic position to the moved-in end position.

3. The control rod drive according to claim 1, wherein said control rod carrying element has a length and an outer diameter varying over said length of said control rod carrying element.

4. The control rod drive according to claim 3, wherein said control rod carrying element has a lower region facing said drive unit and an upper region, said outer diameter of said control rod carrying element is smaller in said lower region than said outer diameter in said upper region resulting in a reduced outer diameter in said lower region.

5. The control rod drive according to claim 4, wherein said outer diameter of said control rod carrying element has a narrowing region that narrows continuously to said reduced outer diameter.

6. The control rod drive according to claim 4, wherein said reduced outer diameter extends constantly over a part of a length of said control rod carrying element.

7. The control rod drive according to claim 5, wherein said control rod carrying element is a hollow piston having a wall with at least one bypass orifice formed in said wall.

8. The control rod drive according to claim 7, wherein said bypass orifice is disposed one of in a region upstream of said narrowing region and in a region of said narrowing region of said control rod carrying element.

9. The control rod drive according to claim 4, wherein said control rod carrying element has, in said lower region having said reduced outer diameter, an outer web, said outer web disposed within said throttle bush when said control rod carrying element is positioned in the moved-in end position.

10. The control rod drive according to claim 9, wherein said throttle bush having an inside diameter, and said outer web is a peripheral annular web having an outer diameter corresponding approximately to said inside diameter of said throttle bush.

11. The control rod drive according to claim 4, further comprising longitudinal webs disposed in a region of said reduced outer diameter on said control rod carrying element.

* * * * *